United States Patent Office 3,466,928
Patented Sept. 16, 1969

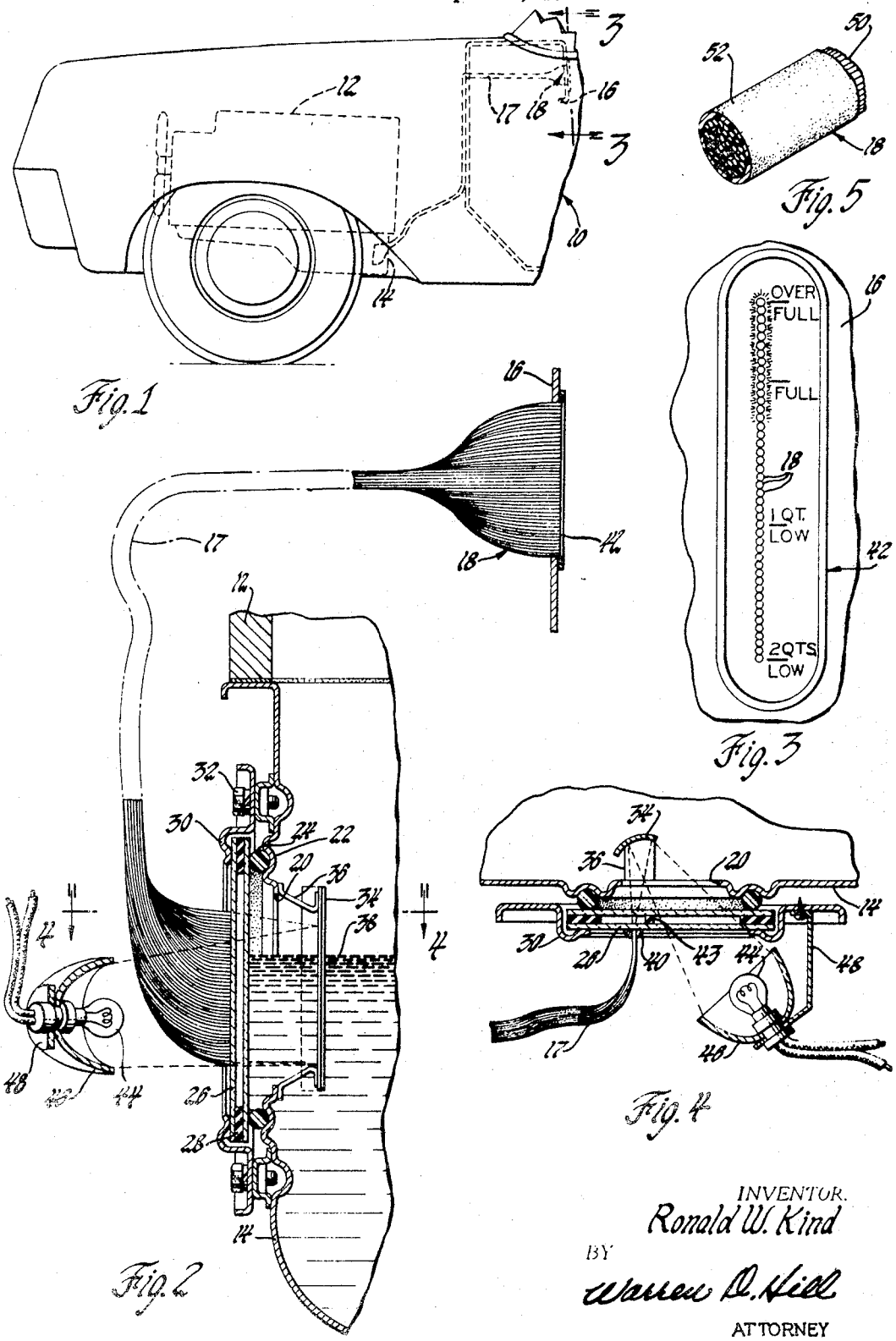

3,466,928
FIBER OPTIC LIQUID LEVEL INDICATOR
Ronald W. Kind, Detroit, Mich., assignor to General Motors Corporation, Detroit, Mich., a corporation of Delaware
Filed Sept. 15, 1967, Ser. No. 667,945
Int. Cl. G01f 23/02
U.S. Cl. 73—293                                    2 Claims

ABSTRACT OF THE DISCLOSURE

To detect at a remote viewing station the level of light absorbing liquid in a container, a window is provided on the container side and a plurality of oriented fiber optic light conductors outside the container have their ends vertically aligned at the window. A light shines in through the window onto a mirror within the container which focuses light onto those light conductors which are above the liquid level. The opposite ends of the light conductors so illuminated are displayed at the viewing station.

---

This invention relates to liquid level indicators and particularly to one embodying fiber optic light conducting elements.

It is frequently desirable to determine the level of liquid in a container from a remote location. In some applications this has been quite difficult, for example, in determining the level of crankcase oil in the engine of an automotive vehicle. Customarily, engine oil level can be determined only by a dipstick and no means are provided whereby the vehicle driver can monitor crankcase oil level from the driver's position.

It is a general object of this invention to provide a remote indicating optical system for a liquid level indicator.

It is a further object of the invention to provide a fiber optic apparatus in a liquid level indicator that may be viewed from a location remote from the liquid container.

It is another obzject of the invention to provide an optical system for detecting from a remote location the level of crankcase oil in a vehicle engine.

The invention is carried out by providing a window in a container wall, a light source for directing light through the window, a mirror within the container for reflecting the light out through the window only above the liquid level and fiber optic light conducting means for transmitting the reflected illumination from the window to a remote viewing station.

The invention is further carried out by providing a transparent window in the side of an engine crankcase and a focusing mirror inside the crankcase near the window. Fiber optic light conductors are provided between the window and a remote viewing station, and a lamp shines light onto the focusing mirror and then onto the ends of those light conductors located above the liquid level whereupon the light is transmitted to the viewing station.

The above and other advantages will be made more apparent from the following specification taken in conjunction with the accompanying drawings wherein like reference numerals refer to like parts and wherein:

FIGURE 1 generally illustrates an apparatus according to the invention installed in an automotive vehicle;

FIGURE 2 is a detailed cross-sectional elevational view of a liquid level indicator according to the invention;

FIGURE 3 is an elevational view of a display panel taken along lines 3—3 of FIGURE 1;

FIGURE 4 is a cross-sectional plan view of the apparatus taken along line 4—4 of FIGURE 2; and FIGURE 5 is a partly broken away view of a fiber optic light conducting member of FIGURE 2.

This invention takes advantage of the light absorbing property of certain liqhids such as engine oil. It is not necessary that the liquid be opaque but only that it prevent the passage of sufficient light to be readily noticeable. In cases where the liquid does not have this property it may be necessary to add a dye or other light absorbing agent to the liquid to effect light absorption.

In FIGURE 1 an automotive vehicle 10 has an internal combustion engine 12 with a crankcase 14. The vehicle 10 includes an instrument panel 16. A cluster 17 of oriented fiber optic light conducting members 18 extends from the crankcase 14 to the instrument panel 16. As shown in FIGURES 2 and 4, the crankcase 14 has an aperture 20 formed therein; surrounding the aperture the crankcase is formed in the undulating portion 22 which forms a seat for a resilient seal member 24. A transparent, heat insulating window 26 preferably comprising a double thickness of glass separated by spacer 28 around the periphery thereof is set against the seal 24 and is held in place by a flanged retaining member 30 secured to the crankcase wall by threaded fasteners 32. Light reflecting means comprising an elongated concave mirror 34 is disposed within the crankcase and attached to the walls thereof by brackets 36. Both the mirror 34 and the inner surface of the window 26 are provided with a transparent coating of fluorinated ethylene-propylene or other non-wetting material for preventing crankcase oil from adhering thereto and which is stable at high temperatures, so that the optical properties of the mirror and window, i.e., reflectance and transparency respectively, are not impaired for those portions which are above the level of the oil 38.

Outside the crankcase, the fiber optic conductors 18 are linearly arranged at terminal points in a vertical plane and are secured to the window 26 by cement 40 so that the ends of the conductors 18 are directed toward the mirror 34. The opposite ends of the conductors 18 extend to the instrument panel 16 where, as shown in FIGURE 3, a viewing station or display panel 42 is provided to hold the conductors again in a vertical linear array. The conductors 18 are oriented so that, for example, the uppermost conductor at the window is also the uppermost conductor at the display panel and the other conductors are arranged in order. It is not necessary that the conductors at the display panel be arranged in either a vertical or linear array so long as the pattern is meaningful. Similarly, it is not essential that the terminal points of the light conductors at the window be arranged in a vertical plane so long as they are in some manner vertically displaced to sample different liquid levels. Referring again to FIGURES 2 and 4, a lamp 44 within a reflector 46 is secured to the window by bracket 48 and beams light through the window onto the concave mirror 34, which in the absence of intervening oil, focuses the light onto the ends of the fiber optic conductors. Light is then, of course, transmitted through the conductors to the display panel 42. A vertical opaque partition 43 between the two glass panes of the window 26 and located between the lamp 44 and the light conductors 18 serves to prevent reflection of light by the inner glass pane onto the ends of the light conductors thereby avoiding spurious light signals.

When, as illustrated, the engine oil 38 partially fills the space between the window and the mirror, the light will be blocked out or diminished in that area and, as shown in FIGURE 3, only those conductors located above the oil level will be brightly illuminated. In the event the engine oil is very clean, some light will be transmitted therethrough, but since the light must traverse the space between the window and the mirror and back again to the fiber optic conductors, much of the light below the oil level will be absorbed and the illumination level of the conductor ends at the display panel 42 will be distinctly different. As mentioned above, the oil or other liquid could be artificially colored or dyed to reduce its transparency if required. In addition, the apparatus should be so designed that the light path through the liquid is great enough to provide adequate light absorption by the liquid.

The lamp 44 is to be connected with electrical circuitry, not shown, to energize the lamp when the engine is not operating so that the oil level in the crankcase will be static and a meaningful reading of the oil level will be obtained.

It will thus be seen that by providing a large number of contiguous light conductors a "line of light" at the display panel or viewing station coupled with suitable indicia on the display panel will indicate the liquid level in the remotely located container. However, it will be apparent that satisfactory results will be obtained by a few spaced light conductors to provide a sampling of several levels.

The ends of the light conductors at the display panel may be fitted with jewels or lenses, not shown, to focus the light toward the viewer thus making the display easier to read.

In the preferred form, as shown in FIGURE 5, the light conductors 18 each comprise a bundle of individual fibers 50 of flexible transparent material such as polymethyl methacrylate, although glass may be used. Each fiber is coated with a polymer film having an index of refraction lower than that of the fiber. The bundle of fibers is jacketed in a protective sheath 52 of polyethylene or other flexible material impervious to moisture and to other environmental agents which might degrade the light conducting qualities of the fibers. For most efficient transmission, the ends of the fiber optic bundles are cut off smoothly or polished. The number of fibers within a bundle depends upon the desired amount of light transmittance, the length of the bundle and the size of the fibers. Where each fiber is 0.010 inch in diameter the fibers in each bundle may number sixteen or a multiple thereof.

It is claimed:

1. A crankcase oil level indicator comprising an aperture in the side of a crankcase housing, a transparent window sealingly engaging the housing and covering the aperture, a plurality of fiber optic light conducting members outside the crankcase extending in an oriented pattern from the window to a remote viewing station, the ends of the several fiber optic members adjacent the the window being displaced vertically relative to each other; and means for selectively illuminating the fiber optic members according to the oil level comprising, a light source mounted outside the crankcase for directing light through the window, an elongated concave mirror mounted within the crankcase spaced from the window in the path of the light and disposed to focus the light onto the ends of the fiber optic members at the window in the region above the oil level, the oil absorbing the light in the region below the oil level whereby the oil level is indicated by the selective illumination of the fiber optic members at the viewing station, and means for preventing obfuscation of the mirror and inner window surfaces by oil films comprising transparent non-adherent coatings thereon.

2. An apparatus for indicating at a viewing station the level of light absorbing liquid in a container comprising a window in the container, a plurality of fiber optic light conducting members extending in an oriented pattern from the window to a viewing station, the ends of the members at the window being displaced vertically relative to each other, means for illuminating the light conducting members above the liquid level including an elongated concave mirror mounted within the container and spaced from the window, means outside the container for directing light through the window onto the mirror, the mirror being disposed to focus the light onto the said ends of those light conducting members above the liquid level, and means for preventing obfuscation of the mirror and inner window surfaces by light absorbing liquid films comprising transparent non-adherent coatings thereon whereby the fiber optic light conducting members at the viewing station corresponding to levels above the liquid level will be illuminated and those corresponding to levels below the liquid level will be less brightly illuminated due to the light absorbing liquid between the mirror and the window.

References Cited

UNITED STATES PATENTS

| 2,109,355 | 2/1938 | Lank | 73—293 X |
| 2,286,014 | 6/1942 | Rowe | 350—96 |
| 2,765,661 | 10/1956 | Thomas | 73—334 |
| 3,120,125 | 2/1964 | Vasel | 73—293 |
| 3,272,174 | 9/1966 | Pribonic | 73—293 X |
| 2,672,757 | 3/1954 | Johnson | 73—330 |

FOREIGN PATENTS 550,127  12/1922  France.

S. CLEMENT SWISHER, Primary Examiner

U.S. Cl. X.R.

350—96